US009913221B2

(12) United States Patent
Farnsworth et al.

(10) Patent No.: US 9,913,221 B2
(45) Date of Patent: *Mar. 6, 2018

(54) APPARATUS AND METHOD FOR TRANSMITTING MESSAGES IN MOBILE TELECOMMUNICATIONS SYSTEM USER EQUIPMENT

(71) Applicant: BlackBerry Limited, Waterloo (CA)

(72) Inventors: Andrew John Farnsworth, Kidderminster (GB); Gordon Peter Young, Leamington Spa (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,397

(22) Filed: Aug. 8, 2016

(65) Prior Publication Data

US 2017/0019849 A1    Jan. 19, 2017

Related U.S. Application Data

(63) Continuation of application No. 13/794,280, filed on Mar. 11, 2013, now Pat. No. 9,432,934, which is a
(Continued)

(51) Int. Cl.
*G08C 17/00* (2006.01)
*H04W 52/02* (2009.01)
(Continued)

(52) U.S. Cl.
CPC ......... *H04W 52/028* (2013.01); *H04L 5/0055* (2013.01); *H04W 52/0209* (2013.01);
(Continued)

(58) Field of Classification Search
CPC .................................................. H04W 52/028
(Continued)

(56) References Cited

U.S. PATENT DOCUMENTS 5,241,542 A    8/1993  Natarajan
5,623,257 A    4/1997  Bachhuber
(Continued)

FOREIGN PATENT DOCUMENTS

EP       2234451      9/2010
WO    2007025138    3/2007

OTHER PUBLICATIONS

Canadian Office Action in Canadian Application No. 2,668,525, dated Aug. 26, 2011.
(Continued)

*Primary Examiner* — Guang Li
(74) *Attorney, Agent, or Firm* — Fish & Richardson P.C.

(57) ABSTRACT

A method and device for transmitting a sequence of messages from a handheld telecommunications device to a telecommunications network is described, the sequence of messages comprising a plurality of messages to be transmitted at specified times. The method comprises transmitting a message of the sequence of messages and turning off at least one of the transmitter and receiver of the device after transmission of at least one of the messages in the sequence of messages. The method has particular application to messages that terminate a radio connection, such as RRC Connection Release Complete messages in a UMTS system.

20 Claims, 9 Drawing Sheets

Related U.S. Application Data continuation of application No. 12/138,653, filed on Jun. 13, 2008, now Pat. No. 8,427,986.

(51) Int. Cl.
*H04W 76/06* (2009.01)
*H04L 5/00* (2006.01)
*H04W 76/04* (2009.01)

(52) U.S. Cl.
CPC ......... *H04W 76/046* (2013.01); *H04W 76/06* (2013.01); *Y02B 60/50* (2013.01)

(58) Field of Classification Search
USPC .......................................... 370/311
See application file for complete search history.

(56) References Cited

U.S. PATENT DOCUMENTS

| | | | |
|---|---|---|---|
| 6,246,867 B1 | 6/2001 | Jakobsson | |
| 6,343,216 B1* | 1/2002 | Kim | H04W 76/028 455/414.1 |
| 6,377,814 B1* | 4/2002 | Bender | H04W 52/20 370/311 |
| 6,477,382 B1 | 11/2002 | Mansfield et al. | |
| 7,020,501 B1* | 3/2006 | Elliott | H04W 52/0216 370/338 |
| 7,542,437 B1* | 6/2009 | Redi | H04W 52/0206 370/311 |
| 7,551,892 B1* | 6/2009 | Elliott | H04W 52/0216 455/41.1 |
| 7,672,673 B2 | 3/2010 | Kojima | |
| 7,864,720 B2 | 1/2011 | Jeyaseelan | |
| 8,139,599 B2 | 3/2012 | Shvodian | |
| 8,254,925 B2 | 8/2012 | Ding | |
| 8,312,142 B2 | 11/2012 | Rinne et al. | |
| 8,315,194 B2 | 11/2012 | Jeong et al. | |
| 8,620,332 B2 | 12/2013 | Laroia et al. | |
| 8,755,313 B2 | 6/2014 | Damnjanovic et al. | |
| 8,959,368 B2 | 2/2015 | Lee | |
| 9,144,020 B2 | 9/2015 | Clevorn | |
| 2001/0055969 A1* | 12/2001 | Bonta | H04W 36/0055 455/436 |
| 2002/0070855 A1* | 6/2002 | Hwang | G01S 13/74 340/539.12 |
| 2002/0155852 A1* | 10/2002 | Bender | H04W 52/20 455/522 |
| 2002/0183053 A1 | 12/2002 | Gopalakrishna et al. | |
| 2003/0063658 A1 | 4/2003 | Heise | |
| 2003/0086379 A1 | 5/2003 | Terry et al. | |
| 2003/0100291 A1 | 5/2003 | Krishnarajah | |
| 2004/0172566 A1 | 9/2004 | Greiger et al. | |
| 2004/0203400 A1 | 10/2004 | Galetti | |
| 2004/0213195 A1* | 10/2004 | Islam | H04W 52/0232 370/342 |
| 2004/0224688 A1 | 11/2004 | Fischer | |
| 2004/0228491 A1 | 11/2004 | Wu | |
| 2004/0242249 A1* | 12/2004 | Neilson | H04W 72/082 455/502 |
| 2005/0013283 A1 | 1/2005 | Yoon et al. | |
| 2005/0083867 A1* | 4/2005 | Dombrowski | H04L 29/12009 370/311 |
| 2006/0034204 A1 | 2/2006 | Lee et al. | |
| 2006/0040682 A1 | 2/2006 | Goertz | |
| 2006/0098599 A1 | 5/2006 | Choi et al. | |
| 2007/0058580 A1 | 3/2007 | Chae | |
| 2007/0133479 A1 | 6/2007 | Montojo et al. | |
| 2007/0149257 A1 | 6/2007 | Cheresh | |
| 2007/0183355 A1* | 8/2007 | Kuchibhotla | H04W 52/0238 370/318 |
| 2007/0274244 A1 | 11/2007 | Yoon et al. | |
| 2007/0286080 A1* | 12/2007 | Kim | H04W 52/0235 370/236 |
| 2008/0014875 A1 | 1/2008 | Farnsworth | |
| 2008/0090573 A1 | 4/2008 | Kim et al. | |
| 2008/0165829 A1 | 7/2008 | Lee et al. | |
| 2008/0207152 A1 | 8/2008 | Welborn | |
| 2008/0207246 A1* | 8/2008 | Shanbhag | H04W 36/30 455/522 |
| 2008/0232404 A1 | 9/2008 | Fischer | |
| 2008/0253312 A1 | 10/2008 | Park | |
| 2008/0305797 A1 | 12/2008 | Somasundaram et al. | |
| 2009/0068977 A1 | 3/2009 | Verstraelen | |
| 2009/0312004 A1 | 12/2009 | Farnsworth et al. | |
| 2010/0118753 A1 | 5/2010 | Mandin et al. | |
| 2012/0269122 A1 | 10/2012 | Lee | |
| 2012/0294144 A1 | 11/2012 | Niemi et al. | |
| 2013/0182644 A1 | 7/2013 | Kim et al. | |
| 2013/0203399 A1 | 8/2013 | Gupta | |

OTHER PUBLICATIONS

Canadian Office Action in Canadian Application No. 2,668,525, dated Nov. 9, 2012.

European Office Action in European Application No. 08158245.4, dated Dec. 13, 2010.

* cited by examiner

APPARATUS AND METHOD FOR TRANSMITTING MESSAGES IN MOBILE TELECOMMUNICATIONS SYSTEM USER EQUIPMENT

RELATED APPLICATION

This application is a continuation of U.S. patent application Ser. No. 13/794,280 filed on Mar. 11, 2013, which is a continuation of U.S. patent application Ser. No. 12/138,653 filed on Jun. 13, 2008, now U.S. Pat. No. 8,427,986, the entire contents of the applications are hereby incorporated by reference herein for all purposes.

BACKGROUND

Technical Field

This application relates to mobile telecommunications systems in general, having particular application in UMTS (Universal Mobile Telecommunications System) in general, and in particular relates to an apparatus and method for transmitting messages in mobile telecommunications system user equipment.

Description of the Related Art

In a typical cellular radio system, mobile user equipment (UE) communicates via a radio access radio network (RAN) with one or more core networks.

BRIEF DESCRIPTION OF THE DRAWINGS

Embodiments will now be described, by way of example only, with reference to the attached drawings, in which.

Figure 1:
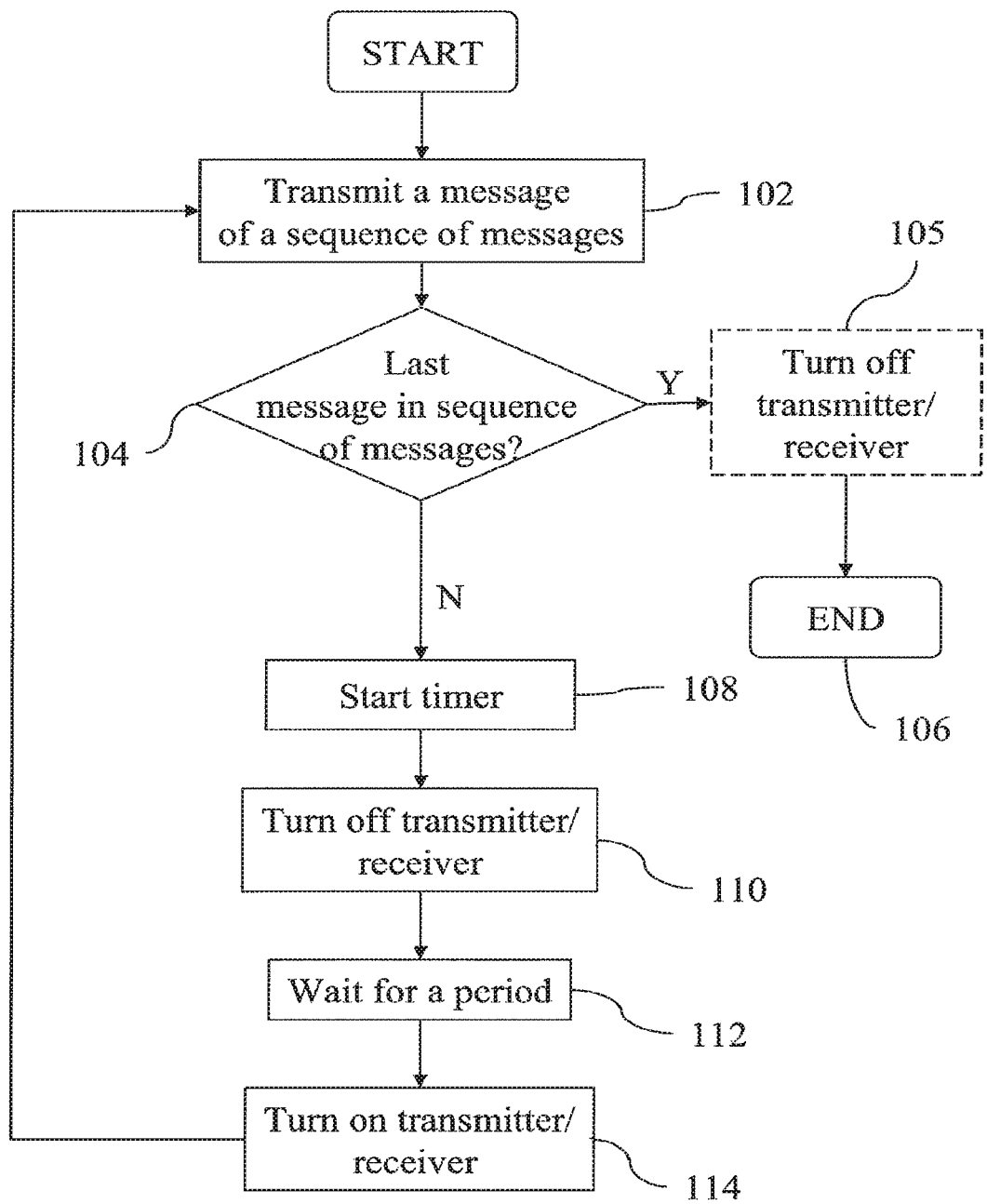
FIG. 1 is a flow diagram illustrating an embodiment of the method.

The method relates to transmitting a sequence of messages from a wireless telecommunications device to a telecommunications network. The sequence of messages comprises a plurality of messages that are to be transmitted at specified times relative to each other. For instance, the sequence of messages may comprise a plurality of messages each of which is to be sent X seconds after the previous one e.g. message 1 at 0 s, message 2 at X seconds, message 3 at 2X seconds etc. The method has particular application to a sequence of messages that are intended to terminate or release a radio connection between the device and the network, particularly in response to a command from the network to terminate the radio connection. The method comprises transmitting a message of the sequence of messages and turning off the transmitter or the receiver or both after transmission of at least one of the messages in the sequence of messages. The method also comprises transmitting a message of the sequence of messages and then turning off at least one of the transmitter and receiver of the device for a set period of time. At the end of the set period of time, the device then turns on whichever of the transmitter and receiver that was previously turned off, in preparation for transmitting a second message at a specified time. The second message is then transmitted and the process repeated, typically at least one of the transmitter and receiver being turned off between transmissions of the messages. This means that the device does not use power powering either the transmitter or the receiver or both during this set period and so battery power may be saved.

The sequence of messages may comprise a first message and one or more messages including a repetition of at least part of the first message.

Typically the device turns on the transmitter or receiver or both at a time relative to the specified time for transmitting the next message e.g. X seconds before the next message is scheduled to be transmitted. That is the transmitter or receiver or both is turned off for a specified time that is defined relative to the specified time for transmitting a next message.

Whether one or both of the transmitter and receiver is turned off during the period will determine the extent of the power savings made. It is believed that turning off the transmitter alone saves more power than turning off the receiver alone. Typical implementations may therefore comprise turning off the transmitter between transmissions and leaving the receiver turned on or turning off both the transmitter and receiver between transmissions. Although, as described above, the transmitter or receiver or both is turned off each time a message is transmitted, power savings (albeit less) may be made by turning off the transmitter or receiver or both in response to the transmission of at least one message in the sequence of messages.

The method is applicable to any wireless telecommunications device in which a sequence of messages is to be transmitted. In typical implementations, no other messages are to be transmitted by the device during the period in which the transmitter or receiver or both is turned off. The method is particularly applicable when the device is to transmit a sequence of messages in an unacknowledged mode i.e. a mode in which the device does not monitor for an acknowledgement from the network of receipt of the message from the device. In addition the method is particularly applicable when the device is in a state such that further messages from the network are not expected during the period in which the sequence of messages is to be transmitted. An example of such a state is when the radio resources of the device are being released, subsequent to a command from the network.

Such a wireless telecommunications device, typically known in the art as user equipment (UE), comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice or data signals or both with the radio access network.

FIG. 1 illustrates a first embodiment of the method as carried out by the wireless telecommunications device. The device transmits a first message of a sequence of messages, action 102. The device then carries out a check, action 104, to determine if the message transmitted is the last message in the sequence of messages. If so, then the method concerned herein is ended, action 106. If the check at action 104 is negative, then the device proceeds to start a timer, action 108, and to turn off the transmitter or receiver or both of the device, action 110. The device then waits for a period defined by the timer, action 112. At the end of this period, the device then turns on the transmitter or receiver or both that had previously been turned off, action 114. The device then returns to action 102 and transmits the next message of the sequence of messages. The actions are repeated until all messages in the sequence of messages have been transmitted and then the method concerned herein ends, action 106. The transmitter or receiver or both may be turned off (action 105) in response to the last message in the sequence of messages being transmitted (action 104 answered in the positive) to enable further power savings.

The idea will now be described further in relation to a third generation wireless telecommunications system known generally as UMTS (Universal Mobile Telecommunications System), and in particular a system that complies with standards as defined by the Third Generation Partnership Project (3GPP). 3GPP has defined many telecommunications standards and reference will now be made to the following one in particular: 3GPP Technical Specification 25.331 which is hereby incorporated by reference in its entirety. Version 3.15.0 Release 99 will be considered. However it is to be appreciated that the method is applicable to other versions and subsequent updates and to any wireless system in which a sequence of messages as discussed above is to be transmitted.

3GPP TS 25.331 v. 3.15.0 section 8.1.4 relates to the procedure to release the radio resource control connection between a wireless telecommunications device (known as user equipment or UE) and the network. This is known as Radio Resource Control (abbreviated to RRC) Connection Release. According to section 8.1.4.2, when the UE is in one of two states (CELL_DCH or CELL_FACH) then the UTRAN may at any time initiate a RRC connection release by transmitting a message known as a "RRC CONNECTION RELEASE" message. When the UE receives a "RRC CONNECTION RELEASE" message, and the UE is in one of the above two states, then the UE acts on the message and ultimately sends a message known as a "RRC CONNECTION RELEASE COMPLETE" message to the network to confirm that the RRC connection has been released.

Figure 2:
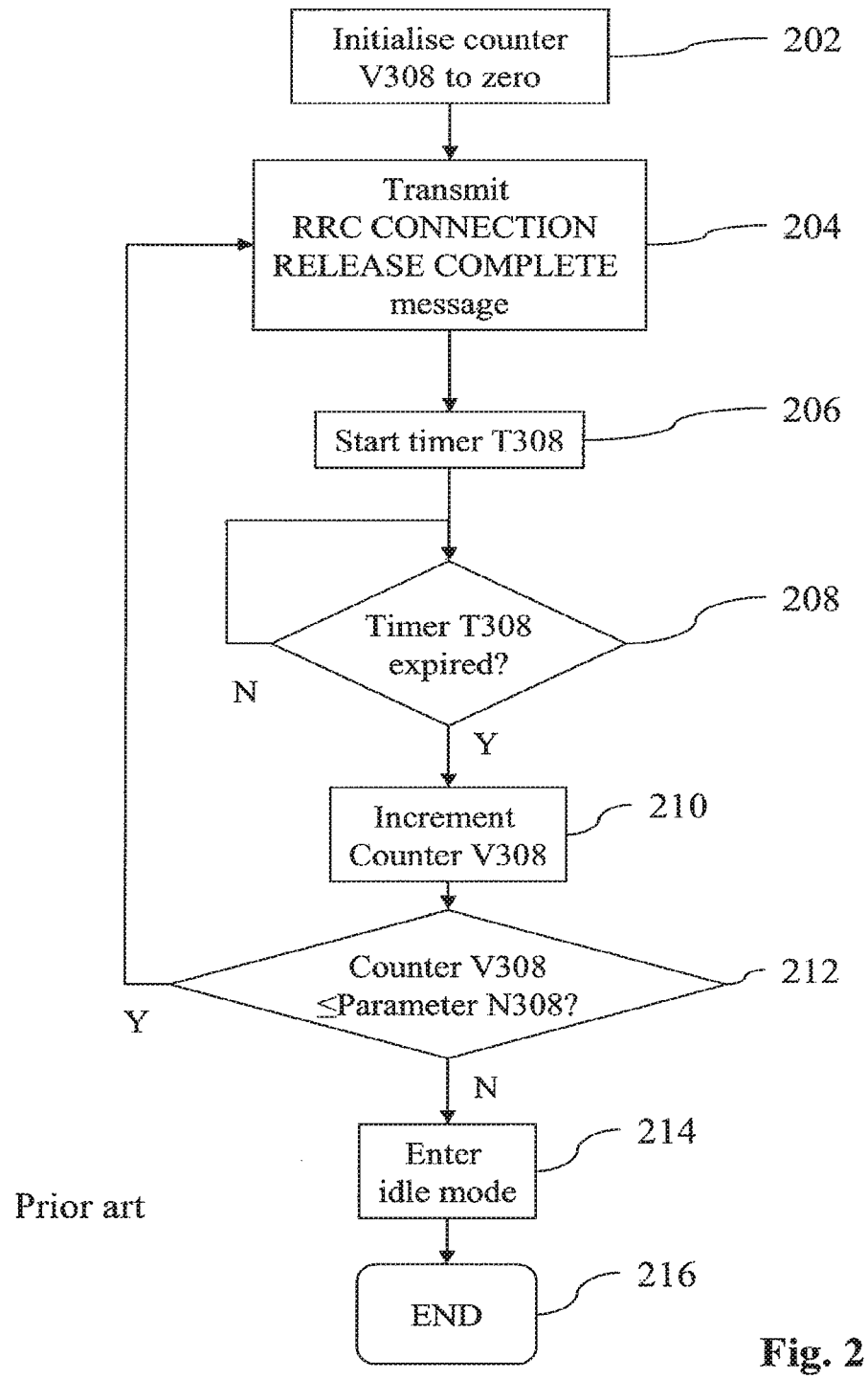
FIG. 2 is a flow diagram illustrating a RRC Connection Release procedure set out in 3GPP TS 25.331.

Section 8.1.4.3 sets out how the UE operates in response to the receipt of a "RRC CONNECTION RELEASE" message from the network. Various scenarios are described and we shall now refer to the situation in which the UE receives the first "RRC CONNECTION RELEASE" message and is in the state CELL_DCH (e.g. a speech call is being terminated). In this state, the device operates in an Unacknowledged Mode (UM). Section 8.1.4.6 is also relevant to when the device is in this state and mode. The operation of the device in this state is shown in FIG. 2. In this scenario, the UE firstly initialises a counter known as V308 to zero, action 202. Then, after a few processes that will not be discussed further here, the UE transmits the message "RRC CONNECTION RELEASE COMPLETE", action 204. On transmission of the "RRC CONNECTION RELEASE COMPLETE" message, the UE starts a timer, known as T308, action 206. The duration of the timer (i.e the value of T308) is defined in an Information Element sent by the network and, according to TS 25.331 v. 3.15.0, may be 40, 80, 160 or 320 milliseconds with a default value of 160 ms.

Once the timer has expired (action 208 being answered in the affirmative), the counter V308 is incremented by one, action 210. The device then compares the value of the counter with the value of a parameter known as N308, action 212. This parameter N308 is defined in an Information Element sent by the network and, according to TS 25.331 v. 3.15.0, is an integer between 1 and 8. If the value of V308 is equal to or smaller than N308, action 212, then the device retransmits (action 204) the "RRC CONNECTION RELEASE COMPLETE" message, albeit with the possibility of carrying out some modifications to information elements in the "RRC CONNECTION RELEASE COMPLETE" message. The process then repeats until at action 212 the value of the counter is greater than the value of the parameter, at which time the device releases its radio resources and enters idle mode, action 214, and the RRC connection release process at the UE ends, action 216.

Figure 3:
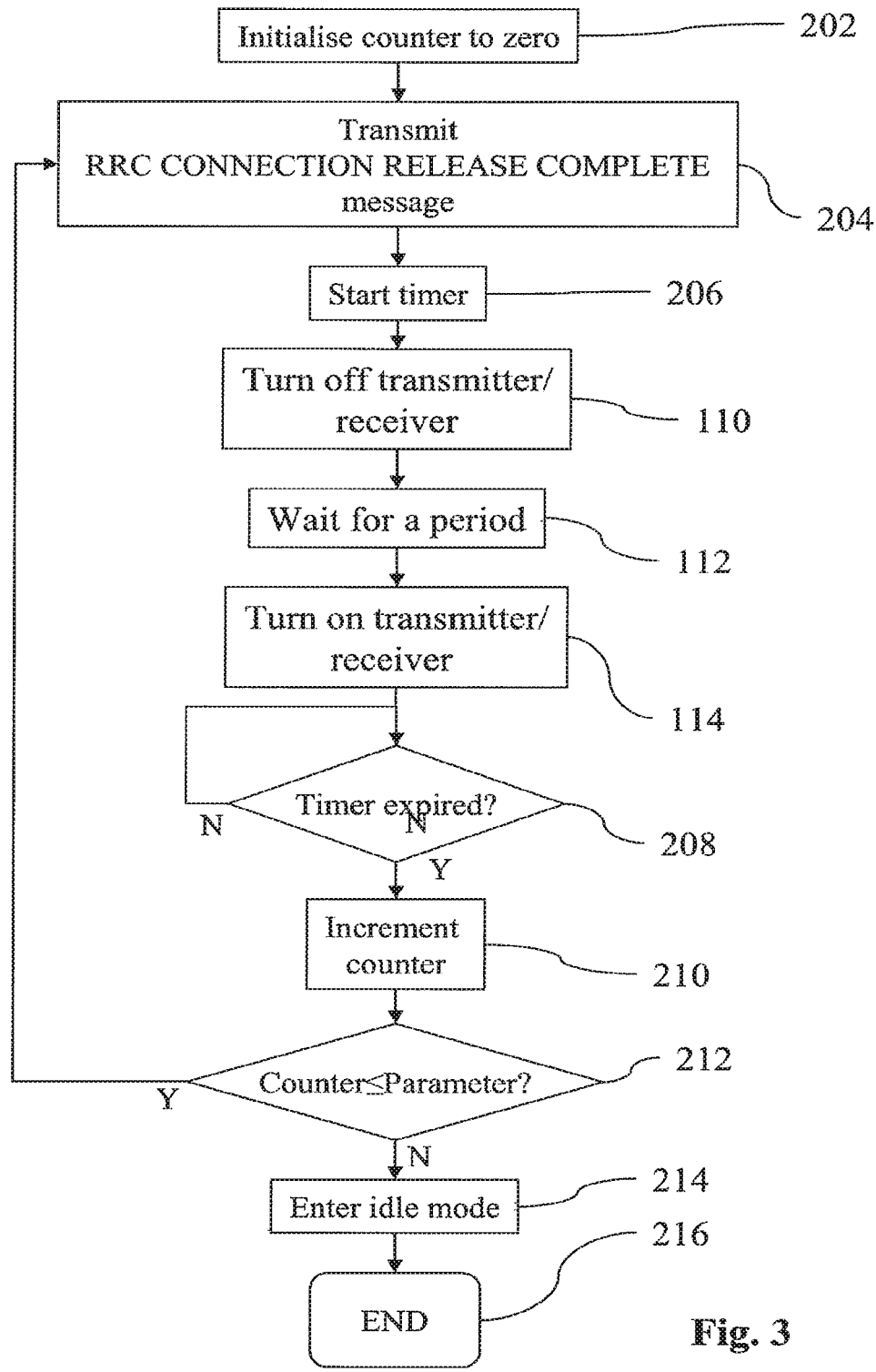
FIG. 3 is a flow diagram illustrating an embodiment of the method applied to a RRC Connection Release procedure.

FIG. 3 shows one embodiment of the proposed method when applied to the scenario as set out in sections 8.1.4.3 and 8.1.4.6, when the UE is in the state of CELL_DCH. The same reference numerals denote the same actions as described previously. Thus, the UE firstly initialises a counter known as V308 to zero, action 202. Then, after a few processes, the UE transmits the message "RRC CONNECTION RELEASE COMPLETE", action 204. On transmission of the "RRC CONNECTION RELEASE COMPLETE" message, the UE starts a timer, known as T308, action 206.

The UE then turns off the transmitter or receiver or both of the device, action 110. The device then waits for a period, action 112. At the end of this period, the device then turns on the transmitter or receiver or both that had previously been turned off, action 114. The device then undertakes standard actions to carry out power measurements etc. required before further transmissions may be undertaken. The period of action 112 is typically set to be less than the period defined by the timer T308. For example, if T308 is set to be 160 ms then the period set in action 112 is less than this (say 60 ms) so that the device has time (100 ms) to stabilise transmission power before the next transmission of a "RRC CONNECTION RELEASE COMPLETE" message. The period may be defined to be relative to T308, for instance Xms less than T308, where X is sufficient for stabilisation of the transmission power. This allows the device to re-establish the Dedicated Physical Channel (DPCH) in time and preparation for the re-transmission of the next "RRC CONNECTION RELEASE COMPLETE" message (the "RRC CONNECTION RELEASE COMPLETE" messages are transmitted on a Dedicated Control Channel DCCH mapped to DPCH or E-DCH).

Once the timer has expired (action 208 being answered in the affirmative), the counter V308 is incremented by one, action 210. The device then compares the value of the counter with the value of a parameter known as N308, action 212. If the value of V308 is equal to or smaller than N308, action 212, then the device retransmits (action 204) the "RRC CONNECTION RELEASE COMPLETE" message, albeit with the possibility of carrying out some modifications to information elements in the "RRC CONNECTION RELEASE COMPLETE" message. The process then repeats until at action 212 the value of the counter is greater than the value of the parameter, at which time the device releases its radio resources and enters idle mode, action 214, and the RRC connection release process ends at the UE, action 216.

Thus the device transmits a first "RRC CONNECTION RELEASE COMPLETE" message of a sequence of "RRC CONNECTION RELEASE COMPLETE" messages. The device then turns off at least one of the transmitter and receiver of the device for a period of time. The device then turns on at least one of the transmitter and receiver of the device at the end of the period of time in preparation for transmitting a second "RRC CONNECTION RELEASE COMPLETE" message at a specified time. The device then transmits the second "RRC CONNECTION RELEASE COMPLETE" message at the specified time. This repeats until all "RRC CONNECTION RELEASE COMPLETE" messages in the sequence of "RRC CONNECTION RELEASE COMPLETE" messages as defined by the parameter N308 have been transmitted and then the method concerned herein ends.

The method illustrated in FIG. 3 shows the transmitter or receiver or both being turned on and off each time the "RRC CONNECTION RELEASE COMPLETE" message is sent. Potential power savings (albeit less) may be made by turning off the transmitter or receiver or both after at least one transmission of a message in the sequence of messages but not necessarily after each transmission.

The power savings provided by this method are cumulative: the greater the number of messages in the sequence of messages to be transmitted, the greater the power savings; also the greater the period in action 112, the greater the power savings. This may be illustrated by considering FIGS. 4A, 4B and 4C. These are examples of timings of two embodiments of the method described. The hatched areas of FIGS. 4A, 4B and 4C indicate when the transmitter or receiver or both is turned off.

Figure 4A:
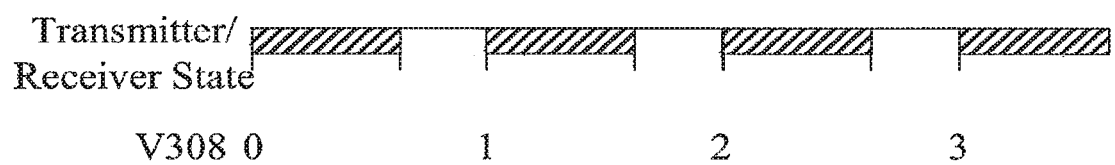
FIGS. 4A, 4B and 4C illustrate examples of potential power savings provided by the method.

In FIG. 4A, T308=320 ms (the maximum allowed in the current standard) and the period that the transmitter or receiver or both is switched off is set to 100 ms before the end of this time i.e. 220 ms. As can be seen from FIG. 4A, the transmitter or receiver or both are turned off for around 70% of the time between transmissions of the "RRC CONNECTION RELEASE COMPLETE" message.

Figure 4B:
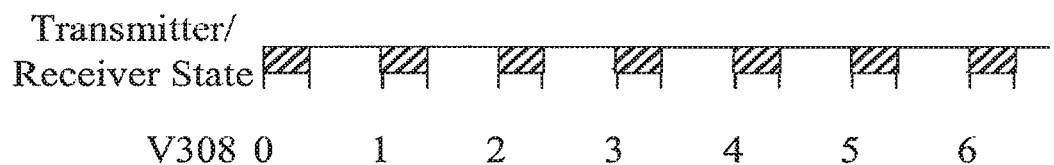

In FIG. 4B, T308=160 ms and the period that the transmitter or receiver or both is switched off is set to 100 ms before the end of this time i.e. 60 ms. As can be seen from FIG. 4B, the transmitter or receiver or both are turned off for around 37% of the time between transmissions of the "RRC CONNECTION RELEASE COMPLETE" message.

Figure 4C:
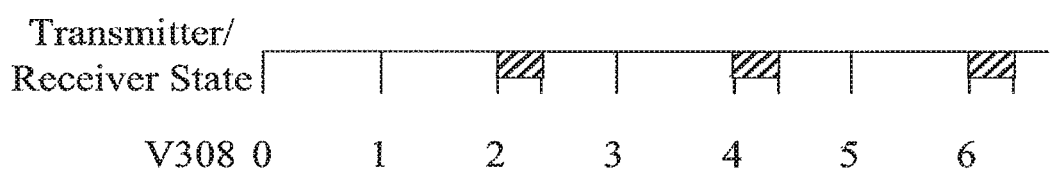

In FIG. 4C, T308=160 ms and the period that the transmitter or receiver or both is switched off is set to 100 ms before the end of this time (i.e. 60 ms) after every other transmission of a message in the sequence of messages. As can be seen from FIG. 4C, the transmitter or receiver or both are turned off for around 18% of the time between transmission of every other "RRC CONNECTION RELEASE COMPLETE" message.

Figure 5:
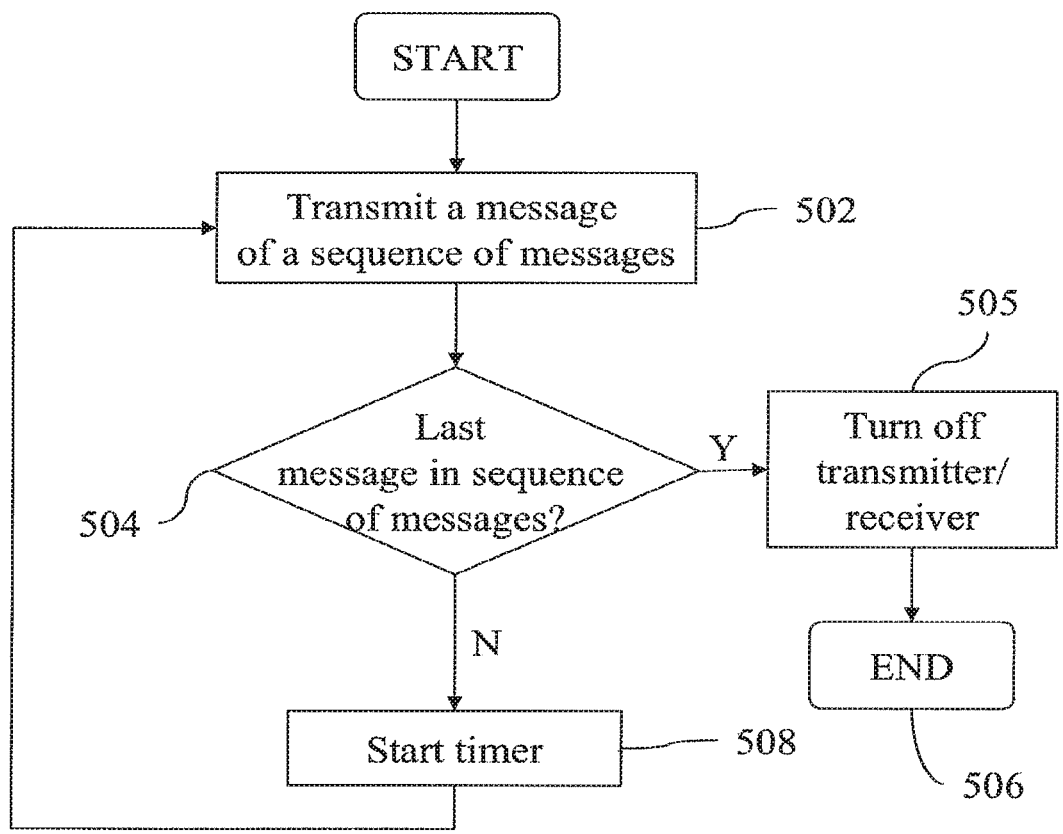
FIG. 5 is a flow diagram illustrating a further embodiment of the method.

FIG. 5 illustrates a further embodiment of the method as carried out by the wireless telecommunications device. The device transmits a first message of a sequence of messages, action 502. The device then carries out a check, action 504, to determine if the message transmitted is the last message in the sequence of messages. If the check at action 504 is negative, then the device proceeds to start a timer, action 508. The device then waits for a period defined by the timer. At the end of this period, the device then returns to action 502 and transmits the next message of the sequence of messages. The actions are repeated until all messages in the sequence of messages have been transmitted. In response to the last message in the sequence of messages being transmitted (action 504 answered in the positive) the transmitter or receiver or both are turned off (action 505) to enable further power savings and then the process ends 506. This embodiment means that the device does not maintain the transmitter or receiver or both in an active state when neither will be needed again for the transmission of a message in the sequence of messages. This is particularly suitable when the messages are to terminate a radio connection between the device and the network.

Figure 6:
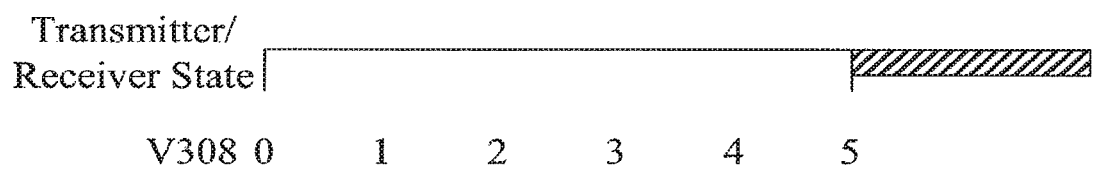
FIG. 6 illustrates examples of potential power savings provided by the method shown in FIG. 5.

FIG. 6 illustrates an example of potential power savings provided by the method shown in FIG. 5. In this example, T308=160 ms and N308=5 (that is, the sequence of messages comprises six messages). The transmitter or receiver or both is switched off in response to the transmission of the last message in the sequence of messages. As can be seen from FIG. 6, the transmitter or receiver or both are turned off after the transmission of the last "RRC CONNECTION RELEASE COMPLETE" message in the sequence.

As can be seen from FIGS. 4A, 4B, 4C and 6, power savings may be achieved by turning off the transmitter or receiver or both after the transmission of at least one message in the sequence of messages. The transmitter or receiver or both may be turned off after the transmission of the last message in the sequence of messages, after each transmission of a message in the sequence of messages or after some transmissions of a message in the sequence of messages but not others.

The method has been described in relation to 3GPP Technical Specification 25.331 and Version 3.15.0 Release 99 in particular, which are hereby incorporated by reference in their entirety. Subsequent versions of Technical Specification 25.331 refer to a Dedicated Channel known as E-DCH and the method is also applicable to this scenario as well as other versions and subsequent updates and to any wireless system in which a sequence of messages for terminating a radio connection are to be transmitted from the UE.

Figure 7:
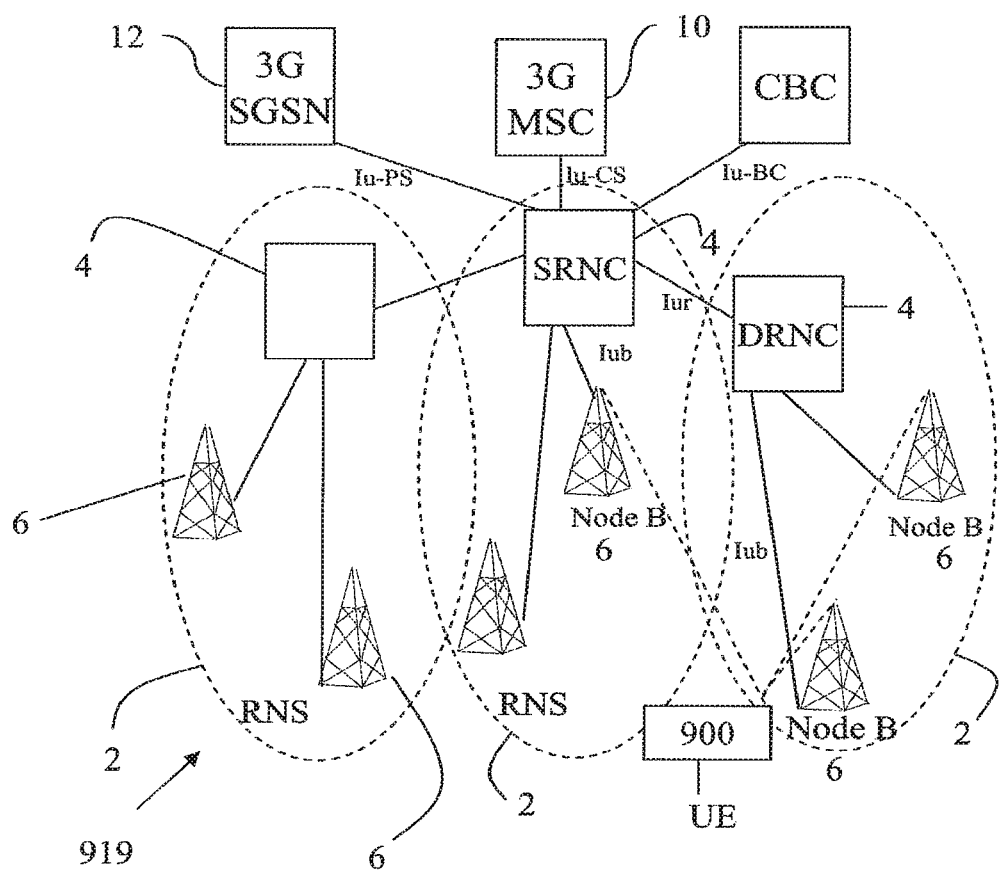
FIG. 7 shows an overview of a network and a user equipment device.

FIG. 7 shows an overview of a network and a UE device. Clearly in practice there may be many UE devices operating with the network but, for the sake of simplicity, FIG. 7 only shows a single UE device 900. For the purposes of illustration, FIG. 7 also shows a network 919 having a few components. It will be clear to a person skilled in the art that in practice a network will include far more components than those shown.

FIG. 7 shows an overview of the radio access network 919 (UTRAN) used in a UMTS system. The network 919 as shown in FIG. 7 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 900 may be mobile within the radio access network. Radio connections (indicated by the straight dotted lines in FIG. 7) are established between the UE and one or more of the Node Bs in the UTRAN.

The radio network controller controls the use and reliability of the radio resources within the RNS 2. Each RNC may also connected to a 3G mobile switching centre 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

Figure 8:
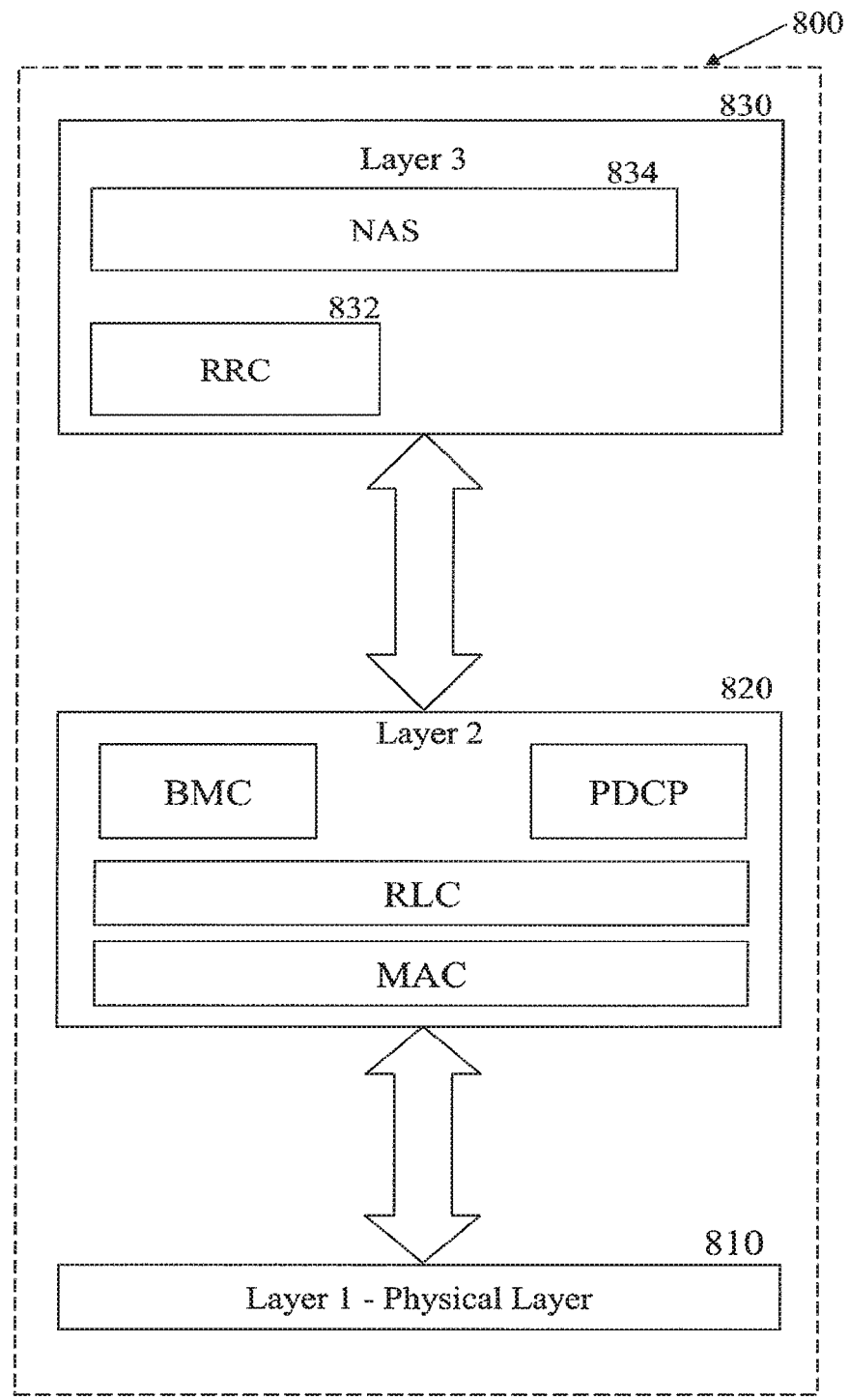
FIG. 8 is a block diagram illustrating an embodiment of a protocol stack apparatus provided with a RRC block, in accordance with the present application.

FIG. 8 is a block diagram illustrating an embodiment of a protocol stack provided in a UE. A Radio Resource Controller (RRC) block 832 is a sub layer of Layer 3 830 of a UMTS protocol stack 800. The RRC 832 exists in the control plane only and provides an information transfer service to the non-access stratum NAS 834. The RRC 832 is responsible for controlling the configuration of radio interface Layer 1 810 and Layer 2 820. When the UTRAN wishes to change the UE configuration it will issue a message to the UE containing a command to invoke a specific RRC procedure. The RRC layer 832 of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The strategies for an apparatus and method for transmitting messages in mobile telecommunications system user equipment as discussed above with reference to the drawings may be implemented by the RRC block 832.

Figure 9:
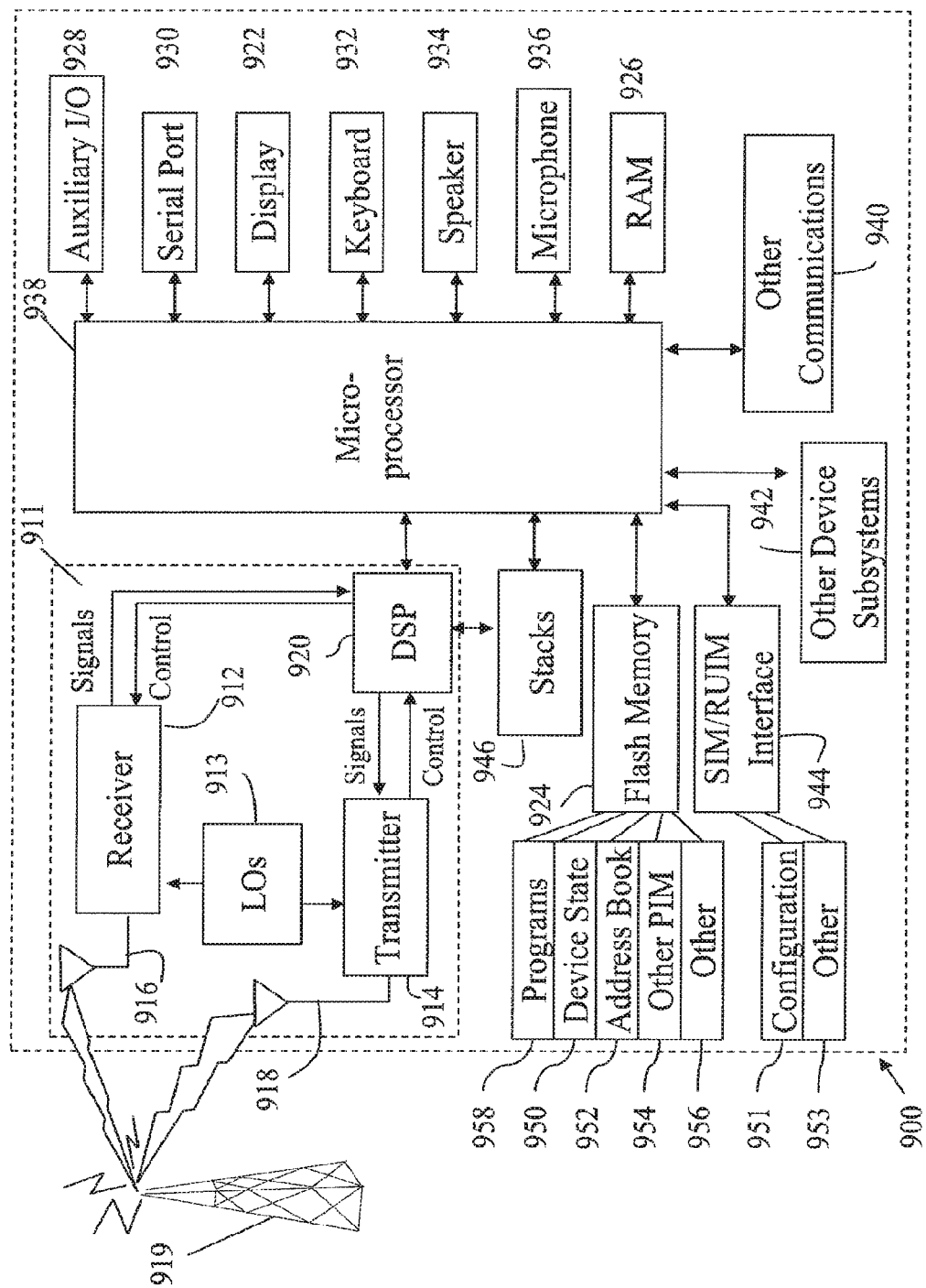
FIG. 9 is a block diagram illustrating a mobile device, which can act as a UE and implement the apparatus and methods of FIGS. 1 to 6.

Turning now to FIG. 9, FIG. 9 is a block diagram illustrating a mobile device, which can act as a UE and co-operate with the apparatus and methods of FIGS. 1 to 6, and which is an exemplary wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, or EDGE network.

Network access requirements will also vary depending upon the type of network 902. For example, in the Mobitex and DataTAC networks, mobile station 900 is registered on the network using a unique identification number associated with each mobile station. In UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 9, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 9, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

When mobile device 900 is used as a UE, protocol stacks 946 include apparatus and method for transmitting messages in mobile telecommunications system user equipment.

EXTENSIONS AND ALTERNATIVES

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

What is claimed is:

1. A method of transmitting a sequence of messages from a wireless telecommunications device to a telecommunications network, the sequence of messages comprising a plurality of messages to be transmitted at specified times, wherein the plurality of messages comprises a first message and at least another message, the method comprising:

transmitting the first message in the sequence of messages;

starting a timer in response to transmitting the first message in the sequence of messages, the timer having an expiry period that determines when a second message in the sequence of messages is to be transmitted;

turning off at least one of a transmitter or receiver of the device for a period of time in response to transmitting the first message in the sequence of messages, wherein the period of time is less than the expiry period of the timer;

at the end of the period of time and prior to the end of the expiry period of the timer, turning on at least one of the transmitter or receiver of the device; and on expiry of the timer, transmitting the second message in the sequence of messages.

2. The method according to claim 1, wherein each subsequent message in the sequence of messages includes a retransmission of the first message.

3. The method according to claim 1 further comprising turning off at least one of the transmitter or receiver of the device after the transmission of each message in the sequence of messages.

4. The method according to claim 1 further comprising initiating the turning off at least one of the transmitter or receiver of the device in response to transmission of the final message in the sequence of messages.

5. The method according to claim 1 wherein the messages in the sequence of messages are to terminate a radio connection between the device and the network.

6. The method according to claim 1 wherein, during transmission of the sequence of messages, the messages are transmitted in an unacknowledged mode.

7. The method according to claim 1 wherein the device is to perform in accordance with the Universal Mobile Telecommunications System.

8. The method according to claim 1 wherein the sequence of messages comprises a sequence of Radio Resource Control Connection Release Complete messages.

9. The method according to claim 1 wherein, after transmitting a message, both the transmitter and the receiver of the device are turned off.

10. A wireless telecommunications device arranged to transmit a sequence of messages to a telecommunications network, the sequence of messages comprising a plurality of messages to be transmitted at specified times, wherein the plurality of messages comprises a first message and at least another message, the device comprising:

a transmitter configured to transmit the message of the sequence of messages; and one or more processors configured to:

start a timer in response to transmitting the first message in the sequence of messages, the timer having an expiry period that determines when a second message in the sequence of messages is to be transmitted;

turn off at least one of a transmitter or receiver of the device for a period of time in response to transmitting the first message in the sequence of messages, wherein the period of time is less than the expiry period of the timer; and at the end of the period of time and prior to the end of the expiry period of the timer, turn on at least one of the transmitter or receiver of the device; and on expiry of the timer, the transmitter configured to transmit the second message in the sequence of messages.

11. The device according to claim 10, wherein each subsequent message in the sequence of messages includes a retransmission of the first message.

12. The device according to claim 10 further arranged to turn off at least one of the transmitter or receiver of the device after transmission of each message in the sequence of messages.

13. The device according to claim 10 further arranged to initiate the turning off at least one of the transmitter or receiver of the device in response to transmission of the final message in the sequence of messages.

14. The device according to claim 10 wherein the messages in the sequence of messages are to terminate a radio connection between the device and the network.

15. The device according to claim 10 wherein the device is arranged to transmit the messages in an unacknowledged mode.

16. The device according to claim 10 wherein the device is to perform in accordance with the Universal Mobile Telecommunications System.

17. The device according to claim 10 wherein the sequence of messages comprises a sequence of Radio Resource Connection Release Complete messages.

18. The device according to claim 10 wherein the device is arranged to turn off both the transmitter and the receiver after transmitting a message.

19. A computer program comprising program encoded on a non-transitory medium for transmitting a sequence of messages from a wireless telecommunications device to a telecommunications network, the sequence of messages comprising a plurality of messages to be transmitted at specified times, wherein the plurality of messages comprises a first message and at least another message, the program comprising computer readable instructions for causing one or more processors to perform operations comprising:

transmitting the first message in the sequence of messages;

starting a timer in response to transmitting the first message in the sequence of messages, the timer having an expiry period that determines when a second message in the sequence of messages is to be transmitted;

turning off at least one of a transmitter or receiver of the device for a period of time in response to transmitting the first message in the sequence of messages, wherein the period of time is less than the expiry period of the timer;

at the end of the period of time and prior to the end of the expiry period of the timer, turning on at least one of the transmitter or receiver of the device; and on expiry of the timer, transmitting the second message in the sequence of messages.

20. The computer program of claim 19, wherein turning on at least one of the transmitter or receiver of the device to prepare transmission of the second message of the sequence of messages comprises stabilizing transmission power for transmitting the second message of the sequence of messages on expiry of the timer.

* * * * *